J. A. LILLIE.
PIPE JOINT.
APPLICATION FILED MAY 28, 1913.
1,099,066.
Patented June 2, 1914.
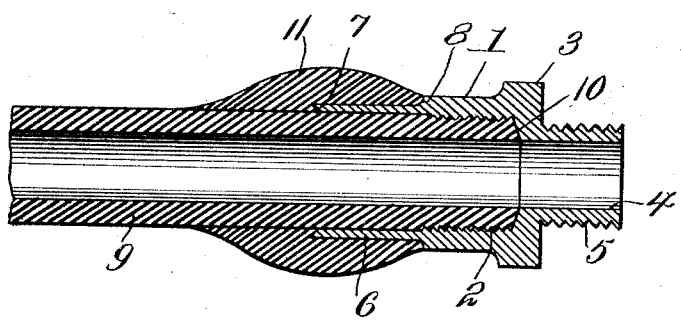
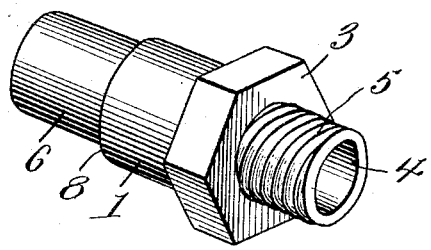
Witnesses
J. T. L. Wright
C. C. Hines
Inventor
John A. Lillie
By Victor J. Evans
Attorney

UNITED STATES PATENT OFFICE.

JOHN A. LILLIE, OF TORONTO, ONTARIO, CANADA.

PIPE-JOINT.

1,099,066.  Specification of Letters Patent.  Patented June 2, 1914.

Application filed May 28, 1913. Serial No. 770,528.

*To all whom it may concern:*

Be it known that I, JOHN A. LILLIE, a citizen of Canada, residing at Toronto, in the Province of Ontario and Dominion of Canada, have invented new and useful Improvements in Pipe-Joints, of which the following is a specification.

This invention relates to pipe couplings or connections, and particularly to those using so-called "wiped" joints.

One object of the invention is to provide a coupling nipple for use in connection with a wiped joint, whereby a stronger connection is afforded than by the use of an ordinary wiped joint, and whereby the strain ordinarily falling upon the wiped joint is largely sustained by the nipple, thus producing a joint of double the ordinary strength.

A further object of the invention is to provide a joint which reduces the amount of time and labor in forming a secure joint, which reduces the amount of material for the wipe, and which allows free expansion and contraction without liability of injury to the joint.

The invention consists of the features of construction, combination and arrangement of parts, hereinafter fully described and claimed, reference being had to the accompanying drawing, in which:—

Figure 1 is a longitudinal section showing the mode of use of the nipple. Fig. 2 is a perspective view of the nipple *per se.*

Referring to the drawing, 1 designates the tubular body of my improved nipple, which is internally threaded, as shown at 2, and is provided at one end with an angular head or enlargement 3, for the application of a wrench or similar tool. Beyond the head 3 the nipple is provided with a projecting end 4 externally threaded, as shown at 5, for connection with one of the pipes to be coupled. The opposite end of the nipple projects from the body in the form of a reduced extension section 6, having a beveled outer end 7 and forming at its point of juncture with the body a shoulder 8. The body and tubular extension 6 of the nipple are adapted to receive the proximate end of the other pipe 9, which is externally threaded to engage the threads 2, and abut against an annular shoulder 10 formed within the head 3. The pipe 9 is an ordinary lead pipe, and is coupled to the thimble in the manner disclosed, and is adapted to be connected with a co-acting pipe at the joint by the threaded extension or end 3 of the nipple. For the purpose of firmly binding the pipe and nipple, I provide the pipe 9 with a wiping 11, of lead, made in the customary manner, which surrounds the pipe and reduced extension 6 of the nipple to equal degrees, and in which said reduced extension is embedded, the binder 11 and nipple further having interlocking connections at the points 7 and 8. By this construction it will be seen that the pipe and nipple are securely held together by the lead binder and threaded connections, the lead binder serving to seal the joint, and at the same time preventing the threaded surfaces from having relative movement and working loose or leaking. A joint is thus provided which is firm and secure over all conditions of service and which is especially desirable in hot water connections, as it will allow free expansion and contraction without liability of the parts working loose or becoming disconnected.

It will be observed that the invention provides a joint which is considerably stronger than an ordinary wiped joint, as it supplements the strength of the usual wiped joint with an added mechanical connection, while reducing the amount of time, labor and material in forming the wipe, while at the same time producing a neater and lighter joint, and one which does not obstruct the pipe in any particular.

Having thus described my invention I claim:

In a pipe joint, the combination of a pipe externally threaded at one end, a nipple comprising a body of angular form having an abutment shoulder to bear against the threaded end of the pipe, a tubular externally threaded end portion projecting at one end of the body, a sleeve extending at the opposite end of the body and receiving the threaded end of the pipe, said threaded end having a bore of a diameter corresponding to the internal diameter of the pipe, said sleeve having a bore corresponding in diameter to the external diameter of the pipe, said sleeve being provided with an inner portion of major thickness having internal threads engaging the threads of the pipe and a reduced portion of a length greater than said major portion, said portions having their outer edges beveled in reverse directions, whereby an abutment shoulder is provided at the point of intersection of the portions of the sleeve and an undercut portion is provided at the reduced extremity of the sleeve, and a lead wiping surrounding the pipe and reduced portion of the sleeve, and engaging said shoulder and undercut portion.

In testimony whereof I affix my signature in presence of two witnesses.

JOHN A. LILLIE.

Witnesses:
    JOHN G. DUNNE,
    MILLIE KURTZ.

Copies of this patent may be obtained for five cents each, by addressing the "Commissioner of Patents, Washington, D. C."